UNITED STATES PATENT OFFICE.

GAËTAN DOBKEVITCH, OF PARIS, FRANCE, ASSIGNOR TO SOCIÉTÉ INTERNATIONALE DE LA LAMPE ELECTRIQUE O. R., OF PARIS, FRANCE, A CORPORATION OF FRANCE.

MANUFACTURE OF INCANDESCENT FILAMENTS.

1,076,873.            Specification of Letters Patent.          Patented Oct. 28, 1913.

No Drawing.           Application filed July 7, 1909. Serial No. 506,369.

*To all whom it may concern:*

Be it known that I, GAËTAN DOBKEVITCH, of 81 Rue de l'Assomption, Paris, France, engineer, have invented a new and useful Improvement in the Manufacture of Incandescent Filaments, which improvement is fully set forth in the following specification.

In the manufacture of incandescent lamp filaments by drawing a paste, composed of metals or of their compounds with or without addition of lampblack agglomerated by a binding agent, the carbon is first eliminated from the filament which is then brought to or maintained in a coherent metallic state. The two operations of decarburization and metallization may be performed successively or simultaneously according to the nature of the gaseous mixture which serves for the formation. The term "metallization" can be equally well employed whether applied to metals properly so called or to metalloid conductors of electricity other than carbon for designating the operation by which they are brought to the state of simple elements. In all known processes the carbon is eliminated by oxidation, which may however be in the presence of an excess of hydrogen, which brings the filament to or maintains it in a metallic state. A process has been described in an application of like date in which sulfur is employed for this purpose. In all these processes metallization is brought about by the reducing action of hydrogen in excess upon the metallic oxid or sulfid. It is evident that these methods are only applicable to such metals or metalloids as are not attacked by oxygen or sulfur to form oxids or sulfids which cannot be reduced in hydrogen at temperatures lower than their volatilization point. This is the case for the majority of the metals useful in lamp filaments and especially those of the osmium and tungsten groups. But the oxids of metals such as those of the group of which vanadium, niobium and titanium form part do not appear to be completely reduced by hydrogen even at very elevated temperatures. Their higher oxids are merely brought to a lower state of oxidation but not to the state of simple elements.

The process which forms the subject of the present invention allows incandescent filaments to be obtained in a practical manner even when oxids are employed which cannot be directly reduced by hydrogen without destruction of the filaments.

Under the present invention filaments are obtained by drawing in the usual manner a paste composed of metals of the described class or of their chemical combinations. Preferably the paste is composed of the lower oxids, the higher oxids and lampblack being added if desired. The metalliferous filaments are then heated in the air at a temperature below a red heat, or, and preferably, to a red heat out of contact with the air; or in a reducing atmosphere composed of hydrogen or a gaseous mixture of hydrogen and oxidizing gases or vapors containing hydrogen in excess with respect to the oxidizing gases. The filament thus becomes a conductor of electricity. It is now subjected to a decarburizing operation which consists in bringing it to a red heat in an atmosphere formed of a gaseous mixture which oxidizes or sulfurizes the carbon but which is of a reducing nature in order that the filament may still conduct electricity. When the filament has been decarburized, it is according to the present invention then metallized by bringing it to a higher temperature than before in an atmosphere containing a mixture of hydrogen and ammonia admixed with small quantities of oxidizing and sulfurizing gases if desired. When the filament is brought to a white heat metallization proceeds rapidly. However if the temperature of the filament be brought above the given limit, the filament may be destroyed.

The reaction produced may be interpreted as follows: The ammonia dissociates by heat and furnishes nitrogen and hydrogen in the nascent state, which consequently possess greater chemical activity than usual. The oxid of the filament-forming element is decomposed, steam and a nitrid of the element constituting the filament being produced. The nitrid however is immediately decomposed by the excess of hydrogen and the filament is immediately metallized. Nitrids of the filament-forming element may also be employed in the composition of the paste from which the filament is drawn; and when they are electric conductors and capable of reduction by hydrogen the filament may be decarburized and metallized in an atmosphere containing hydrogen in large excess.

In order to prevent the destruction of a filament by too high a temperature, this temperature should correspond to that of volatilization of the nitrid. Nitrogen in a nascent state also possesses a certain action upon carbon which it transforms into cyanogen or hydrocyanic acid and can consequently serve for decarburization; but as these gases are very poisonous it is preferable to avoid such formation.

Simultaneous decarburization and metallization may be obtained by operating in suitable gaseous mixtures. The amount of nitrogen in the mixed gases should not exceed a certain proportion or it will be impossible to metallize the filament since this gas unites directly at a high temperature with vanadium, titanium and their analogues. The formation of the filaments takes place in chambers or furnaces filled or traversed by the gaseous current and the portions of the useful gases not taking part in the reactions of formation may be recovered.

The ammonia used in the process may be introduced into the mixture in the state of ammonia prepared beforehand, or it may be generated in the vessel by the action of electric sparks or arcs upon a mixture of hydrogen and nitrogen, or by the decomposition in a chamber filled with hydrogen, of a compound capable of furnishing nitrogen by virtue of a suitable reaction, as, for example the decomposition of the oxygen or halogen or other salts of ammonia by heat or electricity.

The filament thus metallized (upon the same support which has served for the formation or upon a different support) is introduced into the bulb in which a vacuum is formed. The filament is fixed to hooks, of very refractory metal, on the support by means of a cement which does or does not leave, after formation, a metallic residue of the same nature as the filament (this residue may be different provided that it resists very high temperatures). When the cement does not leave a residue the filament solders to the hooks which conduct the current by the fusing together of the metals at the point of contact.

When the filament is mounted in the lamp upon a support different from that which has served for the formation it may be fixed to the leads either by means of a suitable cement or by autogenous soldering or by soldering with a different material from that which forms the hook and the filament. But as filaments of vanadium, titanium, niobium and similar bodies are attacked by nitrogen the soldering cannot be carried out in a current of this gas as can be done with a filament of tungsten, osmium and similar bodies. An atmosphere of hydrogen must be used for this purpose. But when soldering by means of an electric current, as hydrogen ignites easily the gaseous current must be sufficient in quantity to insulate the point to be soldered from the surrounding air for a sufficient distance.

It is preferable to heat the solder by the action of a sufficiently strong current and to employ the more fusible solders such as copper or silver. Aluminum or zinc may also be used as solders.

There are particular difficulties in obtaining a suitable vacuum in lamps having vanadium, titanium or like filaments when the present process of formation of the filament is employed because these bodies unite directly with nitrogen. In order that the filaments may be durable it is necessary that the bulbs should have a given vacuum but not an absolute vacuum and there must be some residual gas. If the vacuum be pushed too far, the filament perishes too quickly and the lamp blackens.

For lamps having vanadium, titanium and similar filaments, the process of lamp making is as follows: The bulb is thoroughly exhausted and the filaments are brought to incandescence in order to release the occluded gases. Then preferably air from which the oxygen may have been removed is again allowed to pass into the bulb, which is again exhausted to a determined pressure. This pressure is calculated in such a manner that the volume of gas remaining contains sufficient inert atmospheric gas such as argon, helium and the like to give a pressure corresponding to the normal vacuum of incandescent lamps after the nitrogen and oxygen have been extracted. The exhaustion of the nitrogen takes place by bringing the filaments to incandescence either by utilizing for this purpose special filaments of the same metal or of a different nitrogen absorbing metal (in this case it will be necessary to bring the filament to incandescence before closing the bulb in order that the atmosphere in the different bulbs may be homogeneous) or by utilizing for this purpose metals such as calcium or magnesium which when heated to a suitable temperature absorb by occlusion or chemical combination nitrogen and nearly all the other gases except hydrogen and the so-called inert gases. If pains be taken to prepare in a separate vessel a certain quantity of these inert gases (argon, helium, neon, etc.) by absorption of the nitrogen and the oxygen they may be introduced into the bulb after having exhausted it as completely as possible and again exhausting to the required extent. Lastly there may even be left in the bulb an atmosphere without appreciable action upon the filaments. There may be present a large quantity of hydrogen for example. But this gas does not give good results owing to its heat and electric conductivity.

It is evident that the present process which is in reality a process of preparation of the metals such as vanadium, titanium, niobium, etc., in a state of purity can be applied to these bodies in a general manner whatever the use to which they are to be put.

Having now particularly described and ascertained the nature of my said invention and in what manner the same is to be performed I declare that what I claim is:

1. In the manufacture of incandescent filaments, the process which comprises heating a metalliferous decarburized filament in an atmosphere comprising hydrogen and ammonia.

2. In the manufacture of incandescent filaments, the process which comprises heating a filament comprising an oxid of a metal of the vanadium class in an atmosphere comprising hydrogen and ammonia.

3. In the manufacture of incandescent filaments, the process which comprises heating a filament comprising an oxid of a metal of the vanadium class in an atmosphere comprising hydrogen and ammonia and then surrounding said filament with an atmosphere of inert gases.

4. In the manufacture of incandescent filaments, the process which comprises preparing a filament comprising an oxid of a metal of the vanadium class, metallizing said filament and heating in an atmosphere comprising hydrogen and ammonia.

5. In the manufacture of incandescent filaments, the process which comprises preparing a filament comprising an oxid of a metal of the vanadium class, metallizing said filament, heating in an atmosphere comprising hydrogen and ammonia and then surrounding with an atmosphere of inert gases.

6. In the manufacture of incandescent filaments, the process which comprises heating to a white heat a metalliferous decarbonized filament in an atmosphere comprising hydrogen and ammonia.

7. In the manufacture of incandescent filaments, the process which comprises heating to a white heat a filament comprising an oxid of a metal of the vanadium class in an atmosphere comprising hydrogen and ammonia.

8. In the manufacture of incandescent filaments, the process which comprises heating to a white heat a filament comprising an oxid of a metal of the vanadium class in an atmosphere comprising hydrogen and ammonia and then surrounding said filament with an atmosphere of inert gases.

9. In the manufacture of incandescent filaments, the process which comprises preparing a filament comprising an oxid of a metal of the vanadium class, metallizing said filament and heating the same to a white heat in an atmosphere comprising hydrogen and ammonia.

10. In the manufacture of incandescent filaments, the process which comprises preparing a filament comprising an oxid of a metal of the vanadium class, metallizing said filament, heating the same to a white heat in an atmosphere comprising hydrogen and ammonia and then surrounding with an atmosphere of inert gases.

In testimony whereof I have signed this specification in the presence of two subscribing witnesses.

GAËTAN DOBKEVITCH.

Witnesses:
H. C. COXE,
FRÉDÉRIC HÁRLÉ.